United States Patent [19]
Sexton

[11] Patent Number: 5,473,757
[45] Date of Patent: Dec. 5, 1995

[54] I/O CONTROLLER USING SINGLE DATA LINES FOR SLOT ENABLE/INTERRUPT SIGNALS AND SPECIFIC CIRCUIT FOR DISTINGUISHING BETWEEN THE SIGNALS THEREOF

[75] Inventor: Daniel W. Sexton, Charlottesville, Va.

[73] Assignee: GE Fanuc Automation North America, Inc., Charlottesville, Va.

[21] Appl. No.: 989,435

[22] Filed: Dec. 11, 1992

[51] Int. Cl.$^6$ .................................................. H04Q 1/00
[52] U.S. Cl. .................. 364/131; 364/230.2; 364/259.1; 364/238.3; 364/DIG. 1; 395/865
[58] Field of Search ....................... 395/275; 340/825.54, 340/825.83, 825.87

[56] References Cited

U.S. PATENT DOCUMENTS

| | | | |
|---|---|---|---|
| 4,181,934 | 1/1980 | Marenin | 395/275 |
| 4,378,589 | 3/1983 | Finnegan et al. | 395/325 |
| 5,327,121 | 7/1994 | Antles, II | 340/825.51 |

Primary Examiner—Thomas C. Lee
Assistant Examiner—Sang Hui Kim
Attorney, Agent, or Firm—James H. Beusse

[57] ABSTRACT

A programmable logic controller is provided in which I/O modules situated in respective slots are coupled to a CPU by a main bus including a serial data line. A dedicated slot enable line is provided from the CPU interrupt controller to each slot into which an I/O module may be positioned. In this manner, the CPU can enable a selected I/O module when desired. The I/O module includes an interrupt feature wherein an interrupt signal is provided to the same slot enable line which communicates a slot enable signal to the I/O module. The I/O module returns an interrupt on the slot enable line at times other than when the slot enable line is being used by the CPU interrupt controller to send a slot enable signal. The CPU interrupt controller includes an interrupt detection circuit which makes a determination of when two conditions simultaneously occur, namely when both a particular slot enable line is active and the CPU is not enabling the corresponding slot with the slot enable signal. The simultaneous occurrence of these conditions indicates that an interrupt is being received from the I/O module coupled to that slot enable line. By employing this apparatus and technique, the slot enable lines are shared by the CPU which uses the slot enable line to enable an I/O module and by the I/O module which uses the same slot enable line to communicate an interrupt to the CPU.

10 Claims, 7 Drawing Sheets

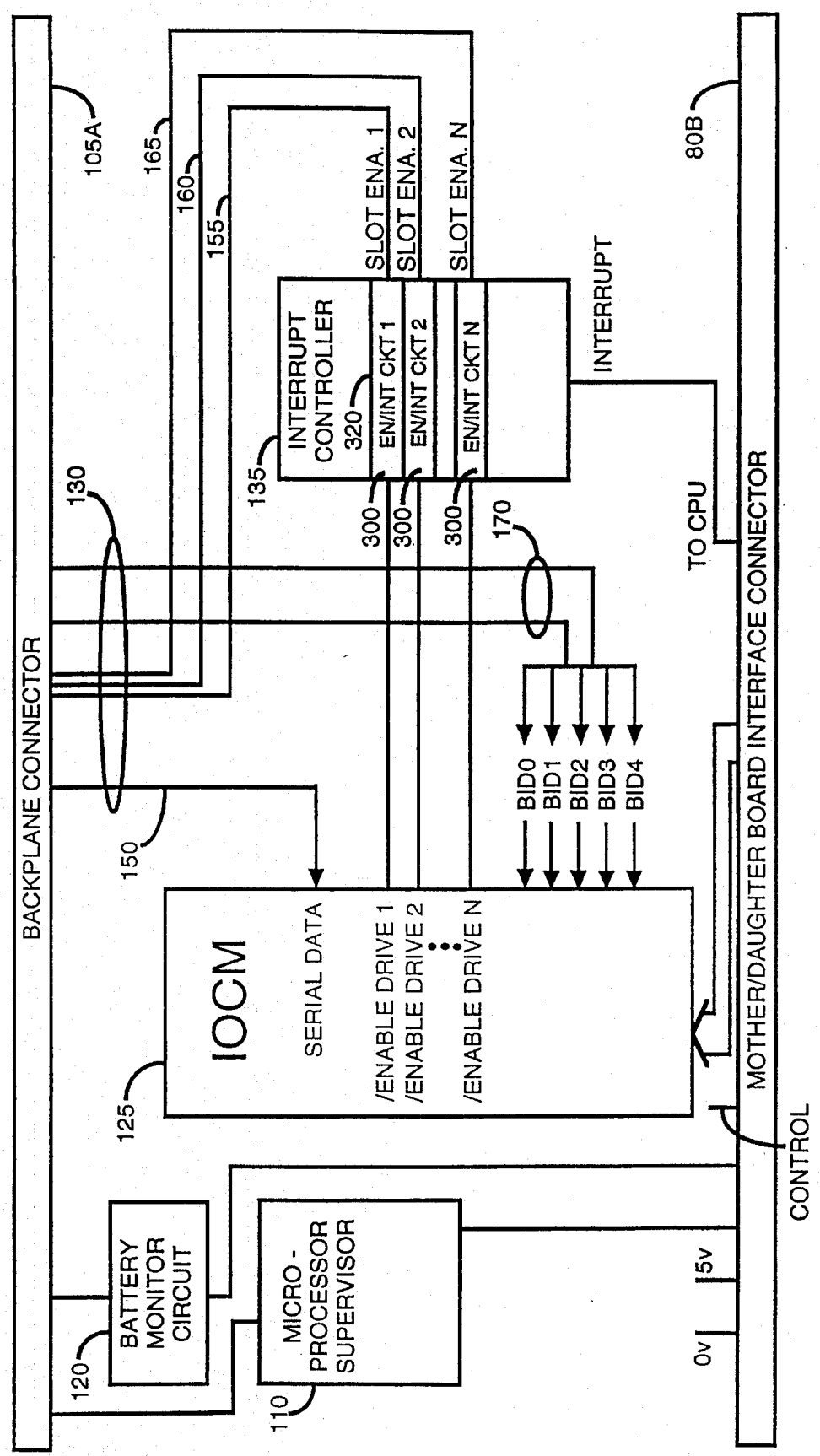

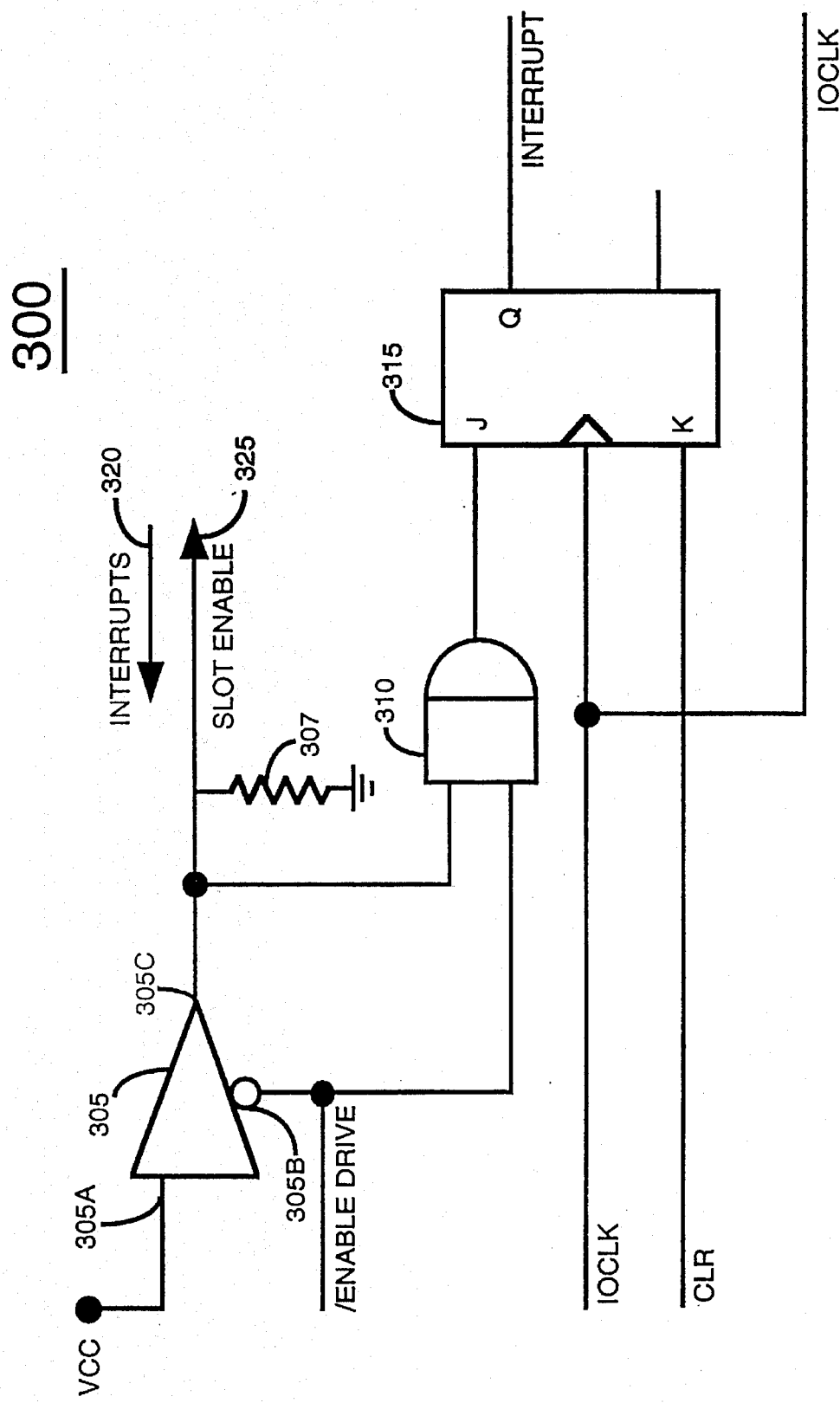

I/O CONTROLLER USING SINGLE DATA LINES FOR SLOT ENABLE/INTERRUPT SIGNALS AND SPECIFIC CIRCUIT FOR DISTINGUISHING BETWEEN THE SIGNALS THEREOF

BACKGROUND OF THE INVENTION

This invention relates in general to programmable logic controllers and, more particularly, to an apparatus and method for providing an interrupt capability to input/output (I/O) modules in a programmable logic controller.

Programmable logic controllers (PLC's) are a relatively recent development in process control technology. As a part of process control, a PLC is used to monitor input signals from a variety of input points (input sensors) which report events and conditions occurring in a controlled process. For example, a PLC can monitor such input conditions as motor speed, temperature, pressure, volumetric flow and the like. A control program is stored in a memory within the PLC to instruct the PLC what actions to take upon encountering particular input signals or conditions. In response to these input signals provided by input sensors, the PLC derives and generates output signals which are transmitted via PLC output points to various output devices to control the process. For example, the PLC issues output signals to speed up or slow down a conveyer, rotate the arm of a robot, open or close a relay, raise or lower temperature as well as many other possible control functions too numerous to list.

The input and output points referred to above are typically associated with input modules and output modules, respectively. Those skilled in the art alternatively refer to such I/O modules as I/O cards or I/O boards. These I/O modules are typically pluggable into respective slots located on a backplane board in the PLC. The slots are coupled together by a main bus which couples any I/O modules plugged into the slots to a central processing unit (CPU). The CPU itself can be located on a card which is pluggable into a dedicated slot on the backplane of the PLC.

PLC's such as the Model 90-30, manufactured by GE-Fanuc and depicted in FIG. 1, employ a backplane having a serial bi-directional bus over which data flows from the I/O modules to the CPU and from the CPU to the I/O modules. The Model 90-30 CPU also employs dedicated slot enable lines from the CPU to the slots which receive the respective I/O modules. That is, a separate slot enable line is provided from the CPU to each slot, respectively. In this manner, the CPU can selectively enable a particular I/O module to interrogate such module. However, in such systems, the CPU only becomes aware of a change in the input state of a particular I/O module when and if the CPU happens to interrogate that particular I/O module. The CPU is otherwise not informed of I/O module input state changes until such CPU initiated interrogation of the module occurs. In the Model 90-30, module ID lines couple each slot back to the CPU so that I/O modules can inform the CPU as to their module type.

It is known that some more expensive PLC's employ a dedicated interrupt line from each I/O module back to the CPU. In such systems, the respective I/O modules can interrupt the CPU whenever an input state change occurs at an I/O module should that be desired. In this manner, the CPU is informed of input state changes at a particular I/O module by the interrupt signal generated on the dedicated interrupt line which is coupled from that I/O module to the CPU.

The circuitry on existing backplanes such as the Model 90-30 PLC is so densely packed that there is generally little room left on such backplanes for adding more pins to the bus to provide such dedicated interrupts from the I/O modules to the CPU.

SUMMARY OF THE INVENTION

Accordingly, one object of the present invention is to provide a programmable logic controller which is capable of transmitting interrupt information from I/O modules back to the CPU without employing additional dedicated interrupt lines.

Another object of the present invention is to provide a programmable logic controller with interrupt capability while maintaining compatibility with earlier I/O modules.

In accordance with one embodiment of the present invention, a programmable logic controller (PLC) is provided which includes a central processing unit (CPU) and a plurality of slots for receiving I/O modules therein. The PLC includes a plurality of slot enable lines respectively coupled to the plurality of slots. At least one I/O module is situated in one of the slots, such I/O module including an interrupt generating circuit for providing an interrupt to the slot enable line coupled to the I/O module. The PLC further includes an interrupt controller which is coupled to the CPU and the slot enable lines. The interrupt controller includes a slot enable signal generating circuit for generating a slot enable signal on a particular slot enable line when the CPU desires to access the I/O module coupled to the particular slot enable line. The interrupt controller also includes an interrupt detecting circuit, coupled to the slot enable lines, for determining when both a particular slot enable line exhibits a logic state corresponding to an interrupt and when the CPU is not attempting to access the particular slot by causing a slot enable signal, to thus ascertain that the I/O module coupled to the particular slot enable line is generating an interrupt. In this manner, the slot enable lines are shared to permit the CPU to enable a particular I/O module via a selected slot enable line and to permit the particular I/O module to interrupt the CPU over the same selected slot enable line.

In another embodiment of the present invention, a programmable logic controller (PLC) is provided including a backplane board having a plurality of slots for receiving I/O modules therein. The PLC includes a central processing unit (CPU) situated on a CPU board coupled to the backplane board. The PLC further includes a serial data bus situated on the backplane board for coupling the CPU to the slots. The PLC also includes a plurality of slot enable lines respectively coupled to the plurality of slots. At least one I/O module is situated in one of the slots. The I/O module includes an interrupt generating circuit for providing an interrupt to the slot enable line coupled to the I/O module. The PLC further includes an interrupt controller which is coupled to the CPU and the slot enable lines. The interrupt controller incorporates a slot enable signal generating circuit for generating a slot enable signal on a particular slot enable line when the CPU desires to access the I/O module coupled to the particular slot enable line. The interrupt controller further incorporates an interrupt detecting circuit, coupled to the slot enable lines, for determining when both a particular slot enable line exhibits a logic state corresponding to an interrupt and when the CPU is not attempting to access the particular slot by causing a slot enable signal, to thus ascertain that the I/O module coupled to the particular slot enable line is generating an interrupt. Again, in this manner, the slot enable lines are shared to permit the CPU to enable a particular I/O module via a selected slot enable line and to permit the particular I/O module to interrupt the CPU over the same selected slot enable line.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 2B is a detailed block diagram of the motherboard portion of the programmable logic controller of the present invention.

FIG. 3 is a schematic diagram of the enable/interrupt processing circuit employed in the present invention.

DETAILED DESCRIPTION OF THE INVENTION

I. Programmable Logic Controller Environment

The operational environment of the programmable logic controller of the present invention is depicted in the detailed block diagram of FIG.'s 2A, 2B and 2C which, when placed side by side, show an overview of the controller. In this particular embodiment of the invention, a programmable logic controller is provided in which the central processing unit (CPU) is located on a CPU daughter card which plugs into a motherboard. The motherboard includes CPU support and I/O support circuitry as discussed later in more detail. The motherboard/daughter card CPU combination plugs into a dedicated CPU slot in the backplane as will be discussed subsequently.

II. Daughter Card/CPU

Figure 1:
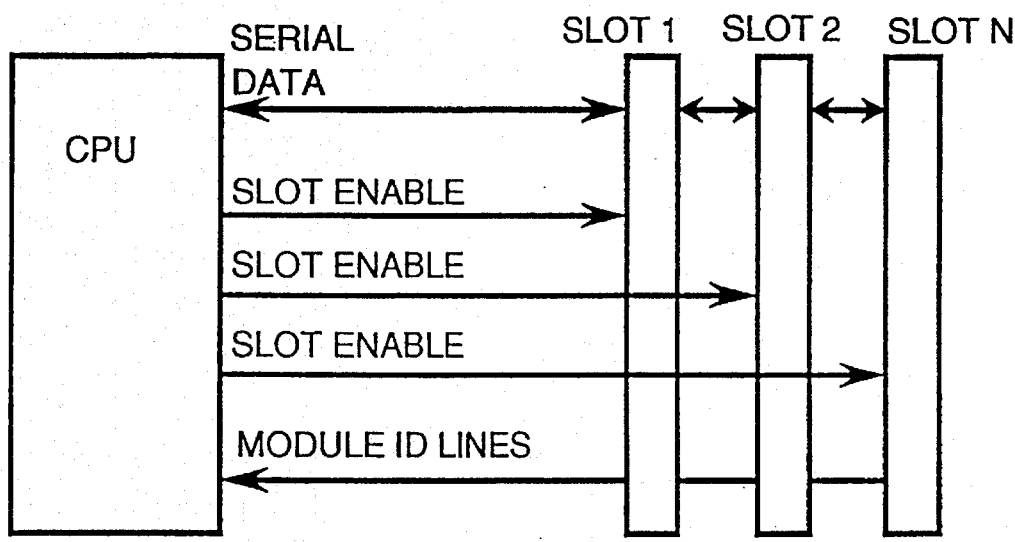
FIG. 1 is a block diagram of a conventional programmable logic controller.
Figure 2A:
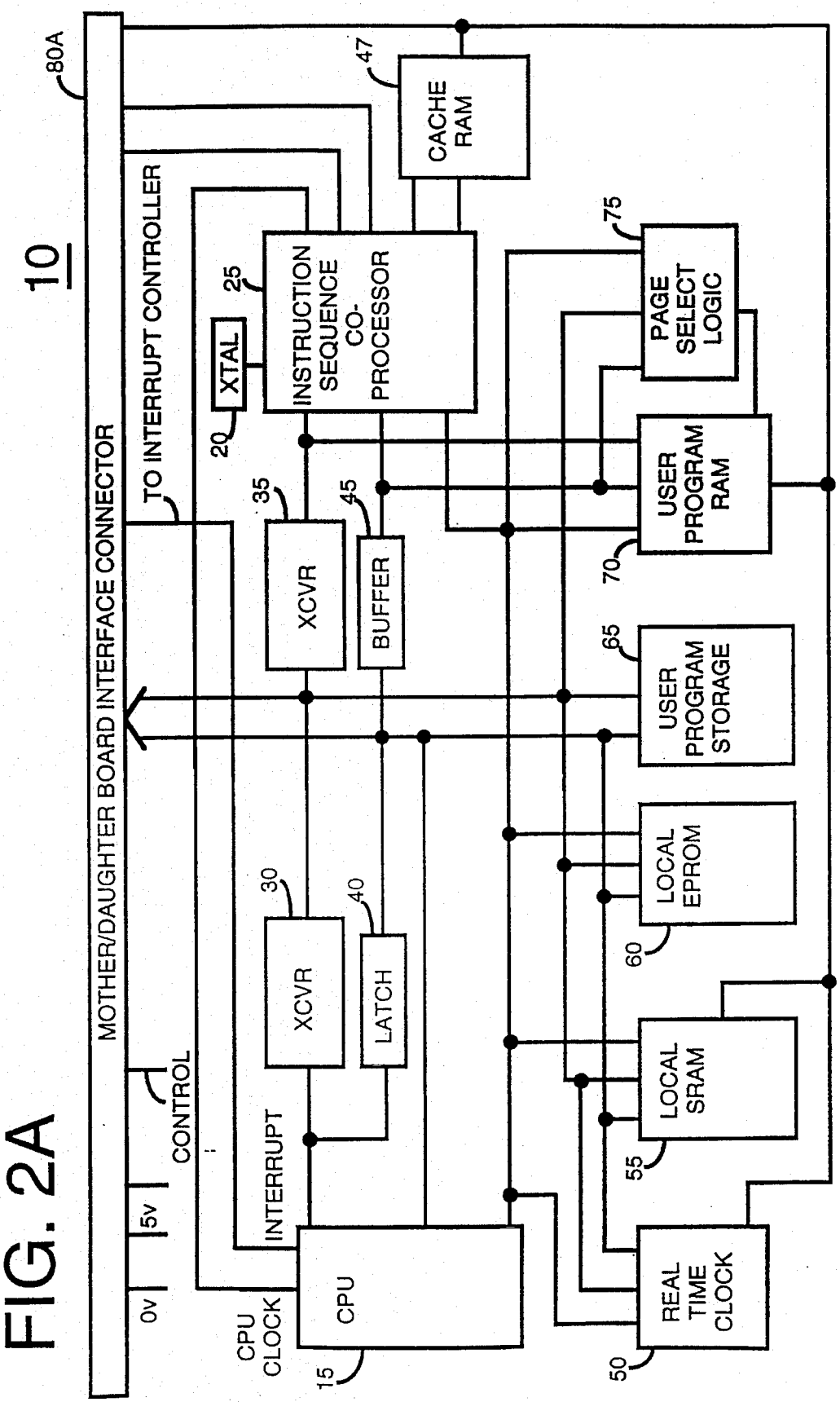
FIG. 2A is a detailed block diagram of the CPU daughter card portion of the programmable logic controller of the present invention.

FIG. 2A depicts the above mentioned CPU daughter card as daughter card 10. Daughter card 10 is alternatively referred to as a CPU module and includes a CPU 15 which performs the processing function of the controller. In one embodiment, an Intel 80188 microprocessor is employed as CPU 15. A time base clock signal, for example at 16 MHz, is provided by crystal (XTAL) 20 to instruction sequence co-processor 25. Co-processor 25 provides a CPU CLOCK signal to CPU 15 as shown. CPU 15 is coupled by transceiver (XCVR) 30 and transceiver (XCVR) 35 to co-processor 25. CPU 15 is also coupled by latch 40 and buffer 45 to co-processor 25. A cache random access memory 47 is coupled to co-processor 25 to provide co-processor 25 with ready access to binary data used in the control program.

CPU daughter card 10 further includes a real time clock 50 which is coupled to CPU 15 to provide real time information thereto.

CPU daughter card 10 also includes a local static RAM (SRAM) memory 55 for operating system use, a local EPROM 60 to provide storage for the operating system firmware, a permanent user program storage memory 65 such as an EEPROM or EPROM to provide permanent storage for user programs, a user program random access memory 70 and a page select logic circuit 75 for facilitating access to such memory.

The CPU daughter card 10 is provided with a mother/daughter board interface connector 80A which couples selected signals from daughter card 10 to a corresponding mating connector on the motherboard. For example, connector 80A couples control, power supply, and address and data bus signals between daughter card 10 and the motherboard. Of significance to the present invention, connector 80A couples the INTERRUPT input of CPU 15 to the I/O interrupt controller located on the motherboard. The operation of the interrupt controller with respect to the present invention will be discussed in more detail later.

III. Motherboard

FIG. 2B shows the above referenced motherboard as motherboard 100. Daughter card connector 80A of FIG. 2A mates with corresponding connector 80B of FIG. 2B on motherboard 100 to couple signals therebetween as shown. Motherboard 100, with daughter card 10 installed thereon, plugs into a dedicated connector slot on the backplane board which is shown later in FIG. 2C. This is accomplished by plugging backplane connector 105A on motherboard 100 into a corresponding dedicated slot on the backplane, such dedicated slot being specifically designed to accept the CPU module.

Motherboard 100 includes a microprocessor supervisor 110 for supervising the operation of CPU/microprocessor 15 on daughter card 10. Supervisor 110 is coupled to CPU daughtercard 10 and the backplane by connectors 80B and 105A, respectively. Motherboard 100 also includes a battery monitor circuit 120 for monitoring the voltage over time of a battery supply on the backplane. Accordingly, batter monitor circuit 120 is coupled to backplane connector 105A to sense battery power from the backplane and is further coupled to mother/daughter board interface connector 80B to report battery condition information back to CPU 15 on daughter card 10.

Motherboard 100 further includes an I/O communications master circuit (IOCM) 125. IOCM 125 controls I/O communications between CPU 15 and the I/O modules plugged into slots in the backplane. The I/O modules, which will be discussed later, include input and output slave circuits (not shown) which interface such modules with the main bus 130 depicted in FIG. 2B.

Motherboard 100 includes an interrupt controller 135 which is coupled between IOCM 125 and CPU 15. Motherboard/daughter board interface connector 80B couples interrupt controller 135 to CPU 15. Backplane connector 105A couples interrupt controller 135 to the backplane as shown. One interrupt controller which may be employed in interrupt controller 135 is the Intel Model 8259 interrupt controller as modified by the teachings herein. Interrupt controller 135 handles interrupts from the I/O modules after those interrupts are processed by IOCM 125 as will be discussed later in detail.

IOCM 125 includes a serial data port which is coupled to a serial I/O data line 150. IOCM 125 further includes /ENABLE DRIVE outputs which are designated /ENABLE DRIVE 1, /ENABLE DRIVE 2, . . . /ENABLE DRIVE N. The respective /ENABLE DRIVE signals indicate when the controller desires to access a card in a particular slot. For example, the /ENABLE DRIVE 1 signal is driven true when the controller desires to access the card in SLOT 1 of the controller.

The /ENABLE DRIVE 1, /ENABLE DRIVE 2, . . . /ENABLE DRIVE N signals from IOCM 125 are processed by interrupt controller 135 which generates corresponding SLOT ENABLE signals designated SLOT ENABLE 1, SLOT ENABLE 2 and SLOT ENABLE N. More specifically, the /ENABLE DRIVE 1, /ENABLE DRIVE 2, . . . /ENABLE DRIVE N signals are processed by respective enable/interrupt handler circuits 300 (EN/INT CKT 1, EN/INT CKT 2 . . . EN/CKT N) within interrupt controller 135 as described in more detail subsequently. Interrupt controller 135 includes slot enable outputs SLOT ENABLE 1, SLOT ENABLE 2 and SLOT ENABLE N which are coupled to respective slot enable lines 155, 160 and 165 in main bus 130.

IOCM 125 includes 5 board ID outputs, namely BID0, BID1, BID2, BID3 and BID4 which form a board ID bus 170. Main bus 130 is thus formed by serial I/O data line 150, slot enable lines 155, 160 and 165 and board ID bus 170, the connection all of which to the backplane will be described later.

IV. Backplane

Figure 2C:
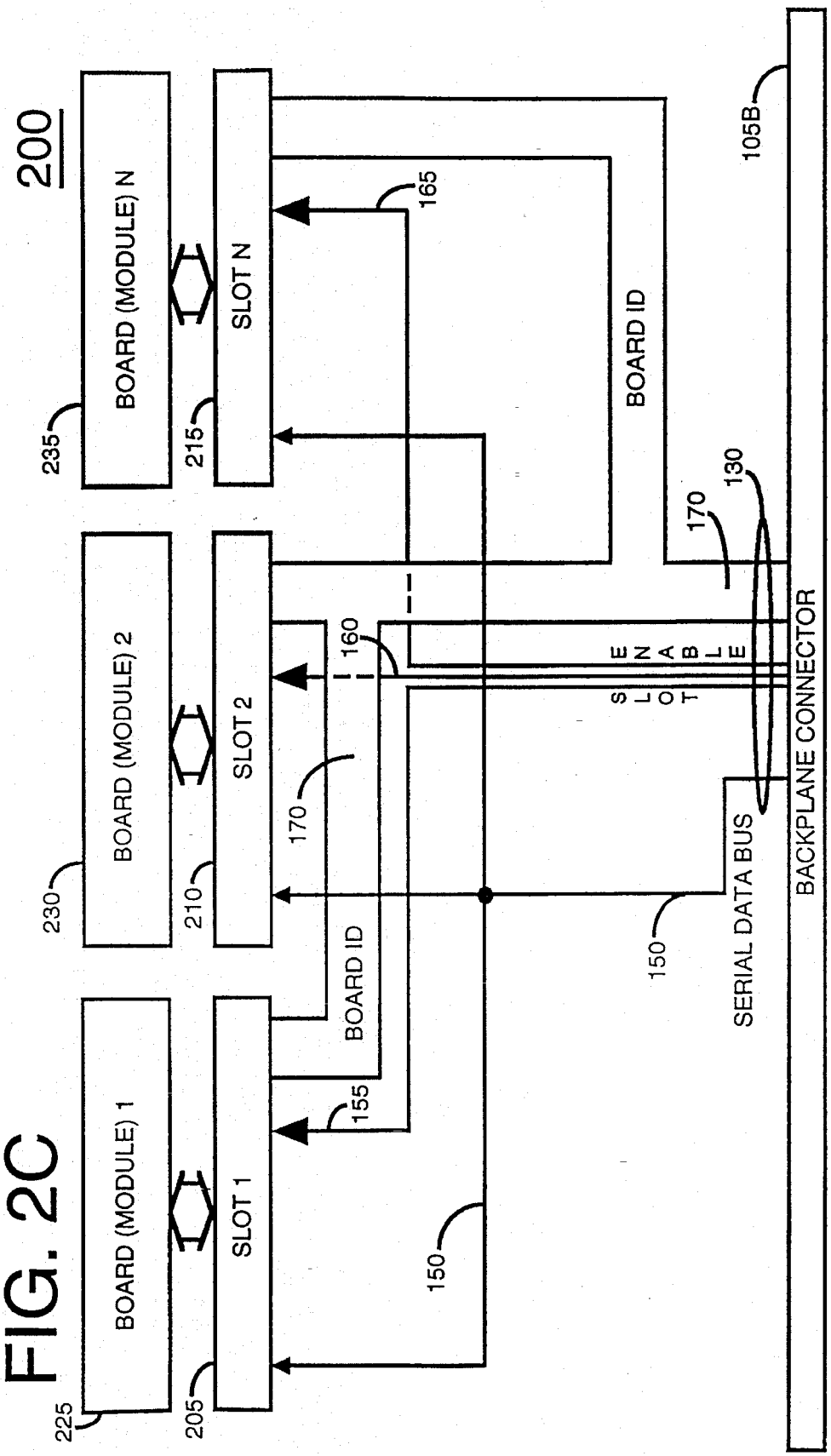
FIG. 2C is a detailed block diagram of the backplane portion of the programmable logic controller of the present invention including I/O modules, plugged into respective slots thereof.

FIG. 2C depicts the above mentioned backplane of the programmable logic controller as backplane 200. Backplane 200 includes slots 205, 210 and 215 which are respectively designated SLOT 1, SLOT 2 and SLOT N wherein N is the total number of slots on the backplane. Respective I/O boards or modules 225, 230 and 235 are pluggable into slots 205, 210 and 215. In FIG. 2C, I/O modules 225, 230 and 235 are designated as MODULE 1, MODULE 2 and MODULE N, respectively.

Backplane 200 includes a backplane connector 105B which mates with a corresponding backplane connector 105A of FIG. 2B to couple serial data I/O line 150, slot enable lines 155, 160 and 165 and board ID bus 170 from motherboard 100 of FIG. 2B to slots 205, 210 and 215 of FIG. 2C.

V. General Operation

As mentioned earlier, IOCM 125 controls the input/output communications between CPU 15 and I/O modules 225, 230 and 235 which are plugged into respective I/O slots 205, 210 and 215 on backplane 200. As part of this task, IOCM 125 (FIG. 2B) controls data collection and distribution on serial data I/O line 150.

If CPU 15 desires to communicate with a particular I/O module located in one of the slots on backplane 200, then IOCM 125 drives the particular /ENABLE DRIVE line corresponding to the slot desired to be accessed. For example, to enable module 225 (MODULE 1) in slot 205 (SLOT 1) for communication of data, IOCM 125 drives its /ENABLE DRIVE 1 line. In response, enable/interrupt handler circuit 300 (EN/INT CKT 1) drives the SLOT ENABLE 1 line coupled thereto true. MODULE 1 then becomes enabled for the input or output of data. As seen in FIG. 2C, serial data line 150 connects slots 205, 210 and 215 for serial communication with IOCM 125. Once a particular I/O module such as module 225 becomes so enabled, it communicates data serially with IOCM 125 over serial data line 150.

In this particular embodiment of the invention, each of I/O modules 205, 210 and 215 are capable of generating a 5 bit module ID code which identifies the particular type of module. Examples of different module types include 8 or 16 bit input modules, 8 or 16 bit output modules and high speed counters. When a particular I/O module such as module 205 is enabled as described above, that module presents its unique module ID code over board ID bus 170 to identify its type to IOCM 125 and CPU 15.

In accordance with the present invention, the same SLOT ENABLE lines 155, 160 and 165 which are used to transmit SLOT ENABLE signals to the respective I/O slots 205, 210 and 215 are also used to transmit interrupt information from the I/O modules in those slots back to IOCM 125. In other words, PLC 10 makes dual use of the SLOT ENABLE lines for both slot interrogation from CPU 15 to the I/O module and for communication of interrupt information from the I/O module back to CPU 15.

Referring again to FIG. 2B, CPU 15 actively drives a selected SLOT ENABLE line via IOCM 125 and interrupt controller 135 only when a selected I/O module in the corresponding slot is to be enabled or interrogated. CPU 15 does not cause the SLOT ENABLE lines to be driven at any other time. An I/O module is thus free to drive the SLOT ENABLE line at any time that the I/O module desires to interrupt, except when CPU 15 is enabling or accessing the slot in which that I/O module is located. If a SLOT ENABLE line is high and CPU 15 is not driving that SLOT ENABLE line, this is interpreted as an interrupt condition by IOCM 125 and CPU 15.

To detect interrupts on the SLOT ENABLE lines in the above described manner, each SLOT ENABLE line is provided with a respective enable/interrupt handler circuit 300 (see FIG. 3) coupled in series therewith. Enable/interrupt handler circuit 300 includes a tri-state device 305 including a signal input 305A, an inverting enable input 305B and an output 305C. Signal input 305A is coupled to the rail voltage, VCC, of a power supply (not shown). Output 305C is designated SLOT ENABLE and is coupled to the SLOT ENABLE line of the respective slot. A pull-up resistor 307 is coupled between output 305C and ground. A /ENABLE DRIVE signal is provided to inverting input 305B as shown in FIG. 3. The /ENABLE DRIVE signal is generated by IOCM 125 at the request of CPU 15 to indicate when CPU 15 desires to access the slot coupled to handler circuit 300.

Handler circuit 300 further includes a two input AND gate 310, one input of which is coupled to the output 305C of tri-state device 305 such that the SLOT ENABLE signal is provided thereto. The remaining input of AND gate 310 is coupled to the inverting enable input 305B of tri-state device 305 such that the /ENABLE DRIVE signal is provided thereto.

The output of AND gate 310 is coupled to the J input of a JK flip-flop 315. An I/O clocking signal designated IOCLK is provided to the clock input of flip-flop 315 as shown in FIG. 3 to provide a time base to flip-flop 315. The IOCLK signal is provided by a clock circuit (not shown) which generates a clocking signal at a predetermined I/O clocking frequency. A CLR or clear signal is provided to the K input of flip-flop 315 within the interrupt handler circuit so that flip-flop 315 can be cleared and reset. The Q output of flip-flop 315 is designated by the label INTERRUPT and is referred to as the INTERRUPT output of handler 300. The INTERRUPT output of handler 300 is coupled to the interrupt input of CPU 15 of FIG. 2A. In FIG. 2B, since one enable/interrupt handler circuit 300 is employed for each slot in PLC 10, a bank of handler circuits has been depicted as handler bank 320. The individual handlers 300 within bank 320 have been depicted as handlers EN/INT CKT 1, EN/INT CKT 2, . . . EN/INT CKT N as shown.

Returning again to FIG. 3, the operation of one of enable/interrupt handler circuits 300 is now discussed. Handler circuit 300 may be viewed as operating in two modes, a first mode wherein enable requests from the CPU are passed over the SLOT ENABLE line to a designated slot and a second mode wherein handler circuit 300 detects the presence of an interrupt coming back from the module over that same SLOT ENABLE line.

Inverted logic is the convention employed in handler circuit 300. However, those skilled in the art will appreciate that the invention may be implemented in either inverted or positive logic. When the CPU and IOCM desire to enable a particular slot, the /ENABLE DRIVE input of handler 300 is a logical low (ENABLE DRIVE is high). By contrast, when the CPU and IOCM do not desire to enable the slot, the /ENABLE DRIVE input is high. When the /ENABLE DRIVE input is high, the SLOT ENABLE line is available for communicating interrupts from the module in that slot back to the IOCM and CPU.

Under the operating condition wherein /ENABLE DRIVE is low, signifying that the CPU and IOCM desire to enable a particular slot, the low /ENABLE DRIVE signal is inverted as it passes through the enable input 305B of tri-state device 305 causing tri-state device 305 to turn on and pass any input signal through to its output. Thus, the VCC input rail voltage is passed through to the SLOT ENABLE output of handler 300 where it acts as a SLOT ENABLE signal for the slot coupled thereto. In other words, whenever the CPU desires to communicate with a slot by causing a /ENABLE DRIVE to be low, a high SLOT ENABLE signal is generated at the SLOT ENABLE output of handler circuit 300 to cause the module in that slot to be enabled.

Under operating conditions wherein /ENABLE DRIVE is high, the logical AND'ing action of AND circuit 310 comes into play. It will be recalled that one input of AND circuit 310 is coupled to the /ENABLE DRIVE input and the remaining input is coupled to the SLOT ENABLE line as seen in FIG. 3. A second arrow 320 labeled INTERRUPTS is used in FIG. 3 to signify that while SLOT ENABLE signals are sent to the slot in the direction indicated by first arrow 325, interrupt signals are received over that same SLOT ENABLE line back from the slot in the direction of second arrow 320. These interrupt signals are provided to one input of AND gate 310.

Two cases are now considered. If the SLOT ENABLE line is high and /ENABLE DRIVE is high (signifying that the CPU does not want to enable the slot), then the output of AND gate 310 goes high. This causes JK flip-flop 315 to change states and the Q output thereof goes high signifying an interrupt. Thus, if the module in the slot is generating an interrupt on the SLOT ENABLE line and the CPU is not simultaneously trying to enable the slot, an interrupt is generated at the INTERRUPT output of handler 300. This interrupt is communicated back to the CPU by interrupt controller 135. However, if the /ENABLE DRIVE is low (signifying that the CPU does want to enable a slot), then handler 300 generates a high SLOT ENABLE signal at its SLOT ENABLE output and the INTERRUPT output of handler 300 remains low, signifying no interrupt.

It is noted that the CPU begins driving the SLOT ENABLE to a logical high (indicating communication with a slot is desired) on the falling edge of the IOCLK clock signal. CPU 15, via IOCM 125 and interrupt controller 135, senses the condition that the SLOT ENABLE is high and that the CPU is not driving it (/ENABLE DRIVE is also high) on the rising edge of the clock. This condition only exists when the I/O module is driving the SLOT ENABLE line and is interpreted by handler 300 as an interrupt.

I/O modules 225, 230 and 235 are designed such that they assert the interrupt signal for one and only one clock period from rising edge to rising edge of the IOCLK clock signal. If the I/O module senses that the SLOT ENABLE line remains high longer than the I/O module itself has driven it, the I/O module interprets this condition as meaning that the I/O module has sent an interrupt concurrently with the CPU driving the SLOT ENABLE line to interrogate the I/O module. In this instance, the I/O module is given only 1 clock period to present its data on serial data bus 150 as opposed to 1.5 clock periods which would otherwise be the case.

When it is stated above that handler circuit 300 is coupled in series with a SLOT ENABLE line, this means that the /ENABLE DRIVE input and the SLOT ENABLE output (indicated at arrow 325) of handler circuit 300 are coupled in series with the SLOT ENABLE line.

VI. Detailed Operation And Timing; I/O Modules and CPU/IOCM

Figure 4:
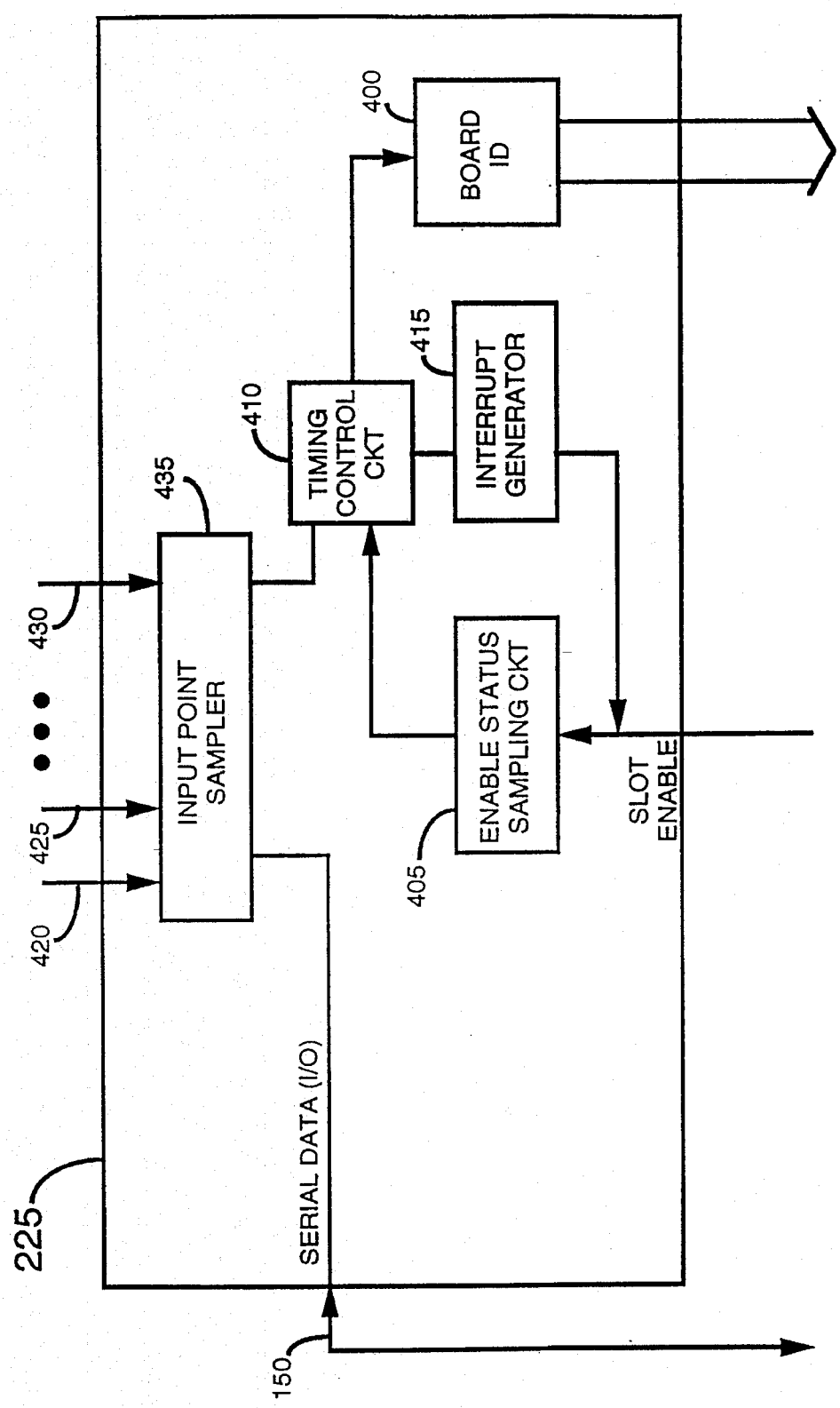
FIG. 4 is a block diagram of an I/O module employed in the programmable logic controller of the present invention.

To facilitate a discussion of the timing of I/O module operations with respect to operations in the remainder of the CPU/IOCM, a typical I/O module 225 is depicted in FIG. 4. I/O module 225 includes the already discussed SERIAL DATA I/O port. Module 225 further includes a module ID (board ID) generator circuit 400 for generating a unique module ID code as discussed. Module 225 also includes an enable status sampling circuit 405 coupled to the SLOT ENABLE line to enable module 225 to determine the status of the SLOT ENABLE line. In this manner, module 225 is apprised as to when it is intended to be enabled. Enable status sampling circuit 405 is coupled to a timing/control circuit 410 which controls the timing of when module 225 issues interrupts on the SLOT ENABLE line. Timing circuit 410 is coupled to an interrupt generator circuit 415 which generates an interrupt on the SLOT ENABLE line at the direction of timing circuit 410.

Although for purposes of generality, module 225 is referred to as an I/O module, module 225 is drawn with a plurality of input points 420, 425 and 430 to serve as an input module example. Each of input points 420, 425 and 430 is coupled to an input point sampler circuit 435 which samples any input information which is provided to such input points. Input point sampler 435 provides the resultant sampled information to the SERIAL DATA I/O port of I/O module 225 at a time controlled by timing/control circuit 410 as discussed later.

Figure 5:
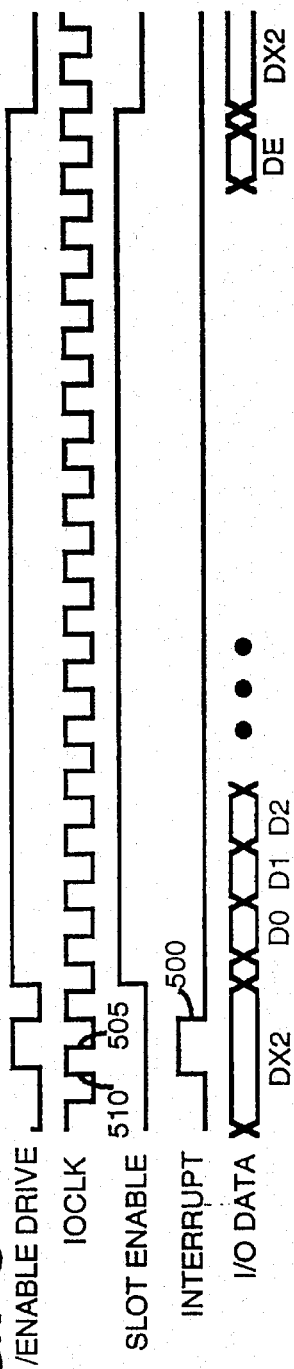
FIG. 5 is a timing diagram depicting an input cycle to an I/O module employed in the present invention.

Each I/O module is timed by timing/control circuit 410 such that when it presents an interrupt on the SLOT ENABLE line it does so during the time that interrupt handler 135 is not driving the SLOT ENABLE line to the module. FIG. 5 is a timing diagram which depicts the timing relationship among the /ENABLE DRIVE, IOCLK, SLOT ENABLE, INTERRUPT and I/O DATA signals in PLC 10. More specifically, FIG. 5 shows an interrupt cycle wherein the interrupt occurs one clock cycle before the input cycle to the I/O module. It is noted that the interrupt is presented as a pulse one clock cycle long starting on the rising edge of the backplane clock. Data bits D0, D1, D2, . . . DE indicate the individual data bits which are transmitted on the serial I/O data line.

During the time that the I/O module is driving the SLOT ENABLE line, the I/O module does not drive board ID lines BID0–BID4. Moreover, the I/O module will not drive serial I/O data line 150 when the I/O module is driving the SLOT ENABLE line. The presence of an interrupt is sensed by the enable/interrupt handler circuit 300 if a one or logic high exists on the SLOT ENABLE line when the CPU (IOCM) is not driving the SLOT ENABLE line during the falling edge of the IO clock, IOCLK. Such an interrupt 500 is depicted in the timing diagram of FIG. 5 coincident with the falling edge 505 of IOCLK. If an I/O module such as 225 desires to issue an interrupt to the CPU and the SLOT ENABLE line is active when sampled on the rising edge 510 of the IOCLK clock signal by enable status sampling circuit 405, then module 225 must wait until the SLOT ENABLE signal is removed (goes low) before presenting the SLOT ENABLE line with the interrupt.

Figure 6:
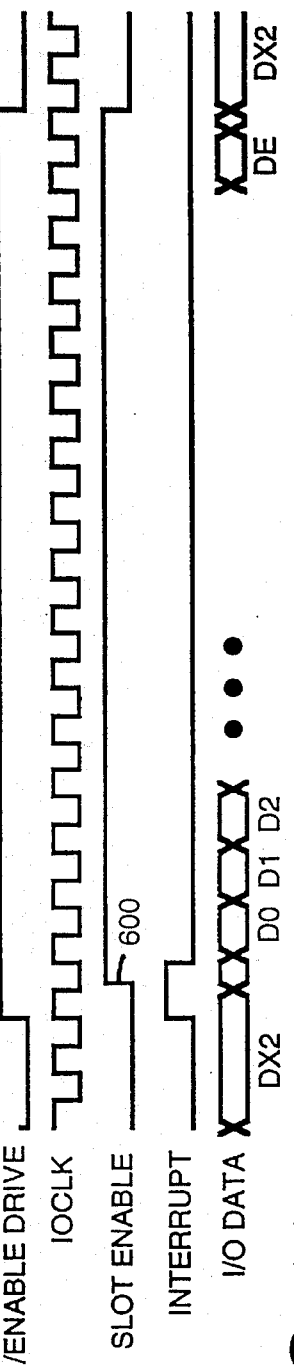
FIG. 6 is a timing diagram depicting another input cycle to an I/O module employed in the present invention.

Timing/control circuit 410 is designed to account for the situation which occurs when the interrupt is generated ½ clock period before the CPU (IOCM) drives the SLOT ENABLE line. In this situation, the CPU will properly detect the interrupt, but the I/O module must be ready to present its data as well to the CPU at the correct time as illustrated in the timing diagram of FIG. 6. Under these conditions, timing/control circuit 410 must control timing to assure that board ID circuit 400 of the I/O module does not drive the board ID lines during the time that interrupt generator 415 is driving the SLOT ENABLE line to create the interrupt. I/O module 225, under the direction of timing/control. circuit 410, must sample input points 420, 425 and 430 at the rising edge 600 of the SLOT ENABLE signal. Also, under these conditions, the I/O module must present the data from the first input point 420 to the SLOT ENABLE line as soon as the I/O module stops driving the SLOT ENABLE line with an interrupt and determines that the SLOT ENABLE line is being driven by the CPU with a SLOT ENABLE signal. In this case, the I/O module must be ready to shift data out on the SERIAL I/O line on each successive clock edge of IOCLK.

Figure 7:
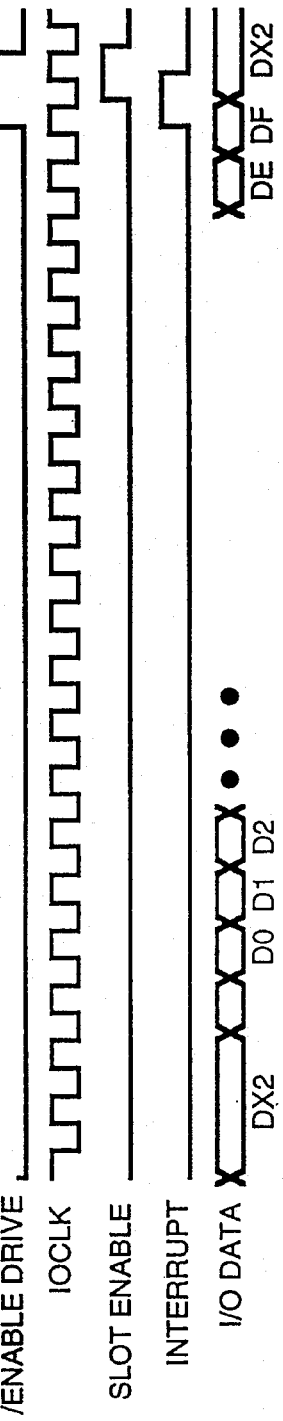
FIG. 7 is a timing diagram depicting an output cycle to an I/O module employed in the present invention.

It is noted that the output cycle for I/O module 225 is more complex than the input cycle illustrated above because the SLOT ENABLE pulse generated by the CPU (IOCM) is only one clock period long. The output cycle timing diagram of FIG. 7 depicts the situation where an interrupt occurs coincident with the SLOT ENABLE pulse from the CPU (IOCM). Enable status sampling circuit 405 is designed such that, under the direction of timing/control circuit 435, status sampling circuit 405 samples the SLOT ENABLE signal on the falling edge of IOCLK and latches the preceding bits on the data bus into an output register (not shown) if a SLOT ENABLE from the CPU is determined to be present. Again, in this situation, the I/O module must drive the SLOT ENABLE line as an interrupt from rising edge to rising edge of IOCLK. The I/O module again must not drive its board ID lines when it is driving the SLOT ENABLE line with an interrupt.

In another operational situation wherein the I/O module desires to drive the SLOT ENABLE line one clock cycle later than illustrated in FIG. 7, then the I/O module detects that it has received a SLOT ENABLE signal from the CPU on the rising edge of IOCLK and delays driving the SLOT ENABLE line with an interrupt for 1 clock cycle.

It is noted since there are times that an I/O module might not drive its board ID when the CPU reads from it or writes to it and that this fact may cause that module to momentarily appear to the CPU as being missing. However, this condition will last for only one interrogation of that module. Thus, when the CPU reads a board ID from a particular slot/module and the board ID appears to be missing, the CPU should try accessing that slot at least one more time before noting that such slot does not have a module installed.

It is also noted that I/O modules such as module 225 which are capable of interrupting CPU 15 typically only pulse the SLOT ENABLE line once per interrupt. For input modules, the interrupt condition is latched in and only allowed to occur after CPU 15 has performed a read on the module. Output modules can decide to clear the interrupt condition and allow the interrupt to occur again based upon an output command from the CPU.

While the above description sets forth a programmable logic controller apparatus, it is clear from the foregoing disclosure that a method of operating the programmable logic controller is also disclosed. That is, a method of communicating with I/O modules situated in slots in a programmable logic controller is provided wherein the controller includes a CPU coupled to the modules by a serial data line therebetween and by an interrupt controller therebetween. In short, a method of operating a programmable logic controller is described which includes the step of providing a plurality of slot enable lines between the interrupt controller and the slots, each of the slot enable lines being dedicated to a respective slot. The method also includes the step of the interrupt controller supplying a slot enable signal at selected times to a particular slot enable line to enable the I/O module in the slot coupled to the particular slot enable line. The method further includes the step of the I/O module supplying an interrupt signal at selected times over the same slot enable line used by the interrupt controller to send the slot enable signal to the I/O module. The method also includes the step of the interrupt controller testing the slot enable line coupled to a particular slot to determine if both the slot enable line exhibits a logic state corresponding to an interrupt and the interrupt controller is not driving the slot enable line with a slot enable signal exhibiting a logic state which enables the particular slot, to ascertain that the interrupt controller is receiving an interrupt from the I/O module.

The foregoing has described a programmable logic controller which advantageously provides the CPU with interrupt information from I/O modules without employing additional dedicated interrupt lines. The disclosed programmable logic controller desirably provides I/O module interrupt capability while maintaining compatibility with earlier I/O modules.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A programmable logic controller comprising:

a central processing unit (CPU);

a plurality of slots for receiving I/O modules therein;

a plurality of slot enable lines respectively coupled to said plurality of slots;

at least one I/O module being situated in one of said slots, said I/O module including an interrupt generating circuit for providing an interrupt to the slot enable line coupled to said I/O module, and an I/O communications master circuit, coupled to the CPU, for generating a plurality of enable drive signals on a plurality of enable drive lines, each enable drive signal exhibiting a first logic state to indicate that the CPU desires to access a particular I/O module in a particular slot, each enable drive signal otherwise exhibiting a second logic state, said I/O communications master circuit generating a different enable drive signal for each slot;

an interrupt controller, coupled to the plurality of enable drive lines and said slot enable lines, said interrupt controller including slot enable signal generating means for receiving an enable drive signal on an enable drive line corresponding to a particular slot, and when said enable drive signal exhibits the first logic state, the slot signal generating means in response generates a slot enable signal on the respective slot enable line coupled to the particular slot thus indicating that the CPU desires to access the particular I/O module, and an AND circuit, coupled to the enable drive line corresponding to the particular slot and the respective slot enable line, for generating a CPU interrupt signal exhibiting a first logic value which indicates an interrupt from the particular I/O module when both the enable drive signal exhibits logic value indicating that the CPU is not attempting to access the particular I/O module and the slot enable signal exhibits a value corresponding to an attempt by the particular I/O module to issue an interrupt, said AND circuit otherwise generation a CPU interrupt signal exhibiting a second logic value indicating no interrupt when the enable drive signal exhibits a logic value indicating that the CPU is attempting to access the particular I/O module.

2. The programmable logic controller of claim 1 wherein said I/O module further comprises enable status sampling means, coupled to a slot enable line, for sampling said slot enable line to determine when a slot enable signal from said interrupt controller is present on said slot enable line.

3. The programmable logic controller of claim 2 wherein said I/O module further comprises control means, coupled to said sampling means, for preventing said I/O module from transmitting an interrupt on said slot enable line when said interrupt controller is using said slot enable line to transmit a slot enable signal.

4. The programmable logic controller of claim 1 wherein said I/O module further comprises interrupt generating means, coupled to said slot enable line, for pulsing said slot enable line once per interrupt to indicate an interrupt.

5. A programmable logic controller comprising:

a backplane board including a plurality of slots for receiving I/O modules therein;

a central processing unit (CPU) situated on a CPU board coupled to said backplane board;

a serial data bus situated on said backplane board for coupling said CPU to said slots;

a plurality of slot enable lines respectively coupled to said plurality of slots;

at least one I/O module being situated in one of said slots, said I/O module including an interrupt generating circuit for providing an interrupt to the slot enable line coupled to said I/O module, and an I/O communications master circuit, coupled to the CPU, for generating a plurality of enable drive signals on a plurality of enable drive lines, each enable drive signal exhibiting a first logic state to indicate that the CPU desires to access a particular I/O module in a particular slot, each enable drive signal otherwise exhibiting a second logic state, said I/O communications master circuit generating a different enable drive signal for each slot;

an interrupt controller, coupled to the plurality of enable drive lines and said slot enable lines, said interrupt controller including slot enable signal generating means for receiving an enable drive signal on an enable drive line corresponding to a particular slot, and when said enable drive signal exhibits the first logic state, the slot signal generating means in response generates a slot enable signal on the respective slot enable line coupled to the particular slot thus indicating that the CPU desires to access the particular I/O module, and an AND circuit, coupled to the enable drive line corresponding to the particular slot and the respective slot enable line, for generating a CPU interrupt signal exhibiting a first logic value which indicates an interrupt from the particular I/O module when both the enable drive signal exhibits a logic value indicating that the CPU is not attempting to access the particular I/O module and the slot enable signal exhibits a value corresponding to an attempt by the particular I/O module to issue an interrupt, said AND circuit otherwise generating a CPU interrupt signal exhibiting a second logic value indicating no interrupt when the enable drive signal exhibits a logic value indicating that the CPU is attempting to access the particular I/O module.

6. The programmable logic controller of claim 5 wherein said I/O module further comprises enable status sampling means, coupled to a slot enable line, for sampling said slot enable line to determine when a slot enable signal from said CPU is present on said slot enable line.

7. The programmable logic controller of claim 6 wherein said I/O module further comprises control means, coupled to said sampling means, for preventing said I/O module from transmitting an interrupt on said slot enable line when said CPU is using said slot enable line to transmit a slot enable signal.

8. The programmable logic controller of claim 5 wherein said I/O module further comprises interrupt generating means, coupled to said slot enable line, for pulsing said slot enable line once per interrupt to indicate an interrupt.

9. A method of communicating with I/O modules situated in slots in a programmable logic controller (PLC), said PLC including a central processing unit (CPU) coupled to said modules by a serial data line therebetween and by an interrupt controller therebetween, said method comprising the steps of:

providing a plurality of slot enable lines between said interrupt controller and said slots, each of said slot enable lines being dedicated to a respective slot;

said interrupt controller supplying a slot enable signal at selected times to a particular slot enable line to enable the I/O module in the slot coupled to said particular slot enable line;

said I/O module supplying an interrupt signal at selected times over the same slot enable line used by said interrupt controller to send the slot enable signal to said I/O module, and said interrupt controller performing an AND operation to determine if both a particular slot enable line coupled to a particular slot exhibits a logic state corresponding to an interrupt and said interrupt controller is not driving said particular slot enable line with a slot enable signal exhibiting a logic state which enables said particular slot, to ascertain that said interrupt controller is receiving an interrupt from said I/O module.

10. The method of claim 9 including the step of serially transmitting data over said serial data line subsequent to said interrupt controller determining that an interrupt has been received from an I/O module.

* * * * *